United States Patent [19]

Padleckas

[11] 4,145,851
[45] Mar. 27, 1979

[54] STRUCTURAL ENCLOSURE

[75] Inventor: Henry Padleckas, 815 N. Oak Park Ave., Oak Park, Ill. 60302

[73] Assignee: Henry Padleckas, Oak Park, Ill.

[21] Appl. No.: 875,408

[22] Filed: Feb. 6, 1978

[51] Int. Cl.² .......................... E04H 1/12; E04H 9/06
[52] U.S. Cl. ..................................... 52/90; 52/79.1
[58] Field of Search ............... 52/90, 79.1, 263, 264, 52/94, 261, 270

[56] References Cited

U.S. PATENT DOCUMENTS

| | | | |
|---|---|---|---|
| 1,536,977 | 5/1925 | Skipworth | 52/90 X |
| 2,095,434 | 10/1937 | Calkins et al. | 52/90 |
| 2,614,664 | 10/1952 | Sherron | 52/264 |
| 2,981,034 | 4/1961 | Burgin | 52/90 X |
| 3,333,376 | 8/1967 | Marsters | 52/90 |
| 3,436,877 | 4/1969 | Gunning | 52/94 |
| 3,820,295 | 6/1974 | Folley | 52/90 X |

FOREIGN PATENT DOCUMENTS

| | | | |
|---|---|---|---|
| 556580 | 10/1957 | Belgium | 52/270 |
| 912001 | 7/1946 | France | 52/90 |

Primary Examiner—J. Karl Bell
Attorney, Agent, or Firm—Mason, Kolehmainen, Rathburn & Wyss

[57] ABSTRACT

A structural weathertight enclosure for conveying systems and the like includes an outer shell having a pair of spaced apart, opposite sidewalls formed of one or more sheet metal panels joined in end-to-end relation. Each of the sidewall panels includes a pair of preformed, flange structures along upper and lower edges, and the upper flange structure includes a downwardly and outwardly sloping eave, a reverse turn and an upwardly and inwardly sloping roof segment. The lower flange structure includes a reverse turn, an upwardly extending inside flange and an inwardly extending floor section.

The shell includes one or more roof panels having a raised central ridge portion with a pair of downwardly and oppositely outwardly sloping roof sections adjoined along outer opposite edges with the sloping roof segments of the upper sidewall flange structures. One or more floor panels are provided with the opposite outer edges joined to the floor sections of the lower flange structure of the sidewall panel. The structural enclosure includes upper chords having side flanges attached to an inside surface of the sidewall panels below the roof and upwardly and inwardly extending sloping roof flanges attached to the underside of the sloping roof sections of the roof panel. The roof panel, the upper chords and the side panels are joined together along common weld lines extending longitudinally of the enclosure.

19 Claims, 5 Drawing Figures

STRUCTURAL ENCLOSURE

BACKGROUND OF THE INVENTION

1. Field of the Invention

The present invention relates to a new and improved structural enclosure for conveying systems and the like and more particularly relates to an enclosure which serves a dual purpose as a weathertight shield or outer shell as well as a structure for supporting a walkway and a conveying system therein while bridging a span.

2. Brief Description of the Prior Art

Prior art enclosures as shells used to house conveying systems and the like generally include sidewalls formed by conventional truss-type support structures on which are attached a plurality of longitudinal girts for supporting side panels, generally of corrugated sheet metal. These side panels carry no load other than their own weight and serve only for weather shielding. The side panels also add to the dead load on the sidewall truss structures. The roofs of prior art enclosures generally are formed with corrugated sheet roofing panels and the roof and sidewalls must be flashed at the eaves and at the ridge to provide a weathertight enclosure. The roof panels must support their own weight and snow loads and are generally supported on purlins in a roof framing system which includes diagonal bracing to resist wind loads. Floors of prior art enclosures are similarly constructed. The prior art enclosures are relatively complex, costly to erect, and not economical in terms of labor required. Moreover, prior art enclosures are subject to difficulty because of the exposed pockets, recesses, clip angles, gusset plates, etc., and moisture and debris often collect in these areas resulting in expensive maintenance during the useful life of the enclosure.

Other prior art enclosures are of circular cross-section with walls, floor and roof provided by sections of rolled plate with rolled stiffening rings normally being required. These tube-like enclosures result in a considerable amount of interior wasted or non-usable space between the arcuately curved outer walls and the adjacent inside vertical or horizontal members.

The present invention provides a new and improved weathertight structural enclosure for conveying systems and the like which may be readily prefabricated and which utilize a stressed skin design, and it is an object of the present invention to provide a new and improved weathertight structural enclosure for conveying systems and the like of the character described.

More particularly, it is an object of the invention to provide a new and improved enclosure of the character described wherein the enclosure shell has a dual purpose function which includes protecting the conveyor from the weather and assuming a load carrying function for itself and the conveyor.

Another object of the present invention is to provide a new and improved enclosure of the character described wherein prefabricated sidewall panels have a dual purpose function and serve both as structural elements and as enclosing walls for the structure.

Another object of the present invention is to provide a new and improved enclosure of the character described wherein diagonal bracing and gusset plates are not required.

Another object of the invention is to provide a new and improved weathertight enclosure of the character described which eliminates the need for horizontal girts normally provided for supporting non-stressed sidewall panels.

Another object is to provide a new and improved weathertight enclosure which provides a smooth and uncluttered surfaces thus reducing maintenance required and providing a structure with no pockets, crevices, clip angles, etc., which might collect debris and eventually cause deterioration, rust, and corrosion to develop.

Another object of the invention is to provide a new and improved weathertight structural enclosure of the character described which is fabricated from standard, commercially available sheet metal or preformed sheet stock.

Another object of the present invention is to provide a new and improved weathertight enclosure for conveying systems and the like which provides a number of advantages over conventional truss-type designs by reducing some of the dimensions by the elimination of bracing, and by the elimination of pockets, recesses, crevices and the like from the surfaces.

Another object of the invention is to provide a new and improved weathertight structural enclosure which provides many advantages over the round, tubular type of prior art enclosures, these advantages including the reduction of the overall dimensions required, the elimination of interior wasted space, the elimination of the need for elaborate support saddles and framing in the interior and the elimination of the requirement of difficult rolling, bending and fitting of panels and stiffeners to portions of the circular shell.

SUMMARY OF THE INVENTION

The foregoing and other objects and advantages of the present invention are accomplished in an illustrated embodiment which comprises a new and improved structural, weathertight enclosure for conveying systems and the like. The enclosure or shell is provided with a pair of spaced apart, opposite sidewalls formed of one or more sidewall panels of sheet metal joined in an end-to-end relation. Each of the sidewall panels includes a pair of preformed, flange structures along upper and lower edges. The upper flange structure includes a downwardly and outwardly sloping eave, an integral reverse turn and an upwardly and inwardly sloping roof segment. The lower flange structure includes a reverse turn, an upwardly extending inside flange and an inwardly extending floor flange. Roof panels are joined to the side panels and have a raised central ridge with integral downwardly and oppositely outwardly sloping roof sections joined along opposite edges to the sloping roof segments of the upper flange structures of the sidewalls. The shell includes floor panels having opposite edges joined to the floor flanges of the lower flange structure of the sidewall panels.

Pairs of longitudinally extending, upper and lower interior chords are provided and the upper chords include a side flange attached to the inside surface of the adjacent sidewall panels and an upwardly sloping roof flange attached to the underside of the sloping roof section of the sidewall. The side panels, upper chord and roof sections are all joined together along a common, longitudinally extending weld line. The lower chords include an upstanding side flange attached to the inside surface of the sidewall which serves as a kickplate, and an inwardly extending floor flange attached to the floor sections of the sidewall lower flange structure and the floor panel. The lower chord, the floor panel, and the lower flange structure of the sidewall panels are all interconnected along a common longitudinally extending weld line. The resulting shell or enclosure utilizes the side panels as stressed skin, load carrying members which form tension diagonals of an imaginary truss comparable to separate diagonal members as usually provided in conventional, truss-type enclosures. In addition, the weathertight structural enclosure of the present invention provides smooth, good looking outer and inner surfaces free of crevices, clip angles, gusset plates, and the like, and thus liquid and debris collection areas where corrosion and rusting take place are generally eliminated.

BRIEF DESCRIPTION OF THE DRAWINGS

For a better understanding of the present invention, reference should be had to the following detailed description taken in conjunction with the drawings, in which.

DESCRIPTION OF THE PREFERRED EMBODIMENT

Figure 1:
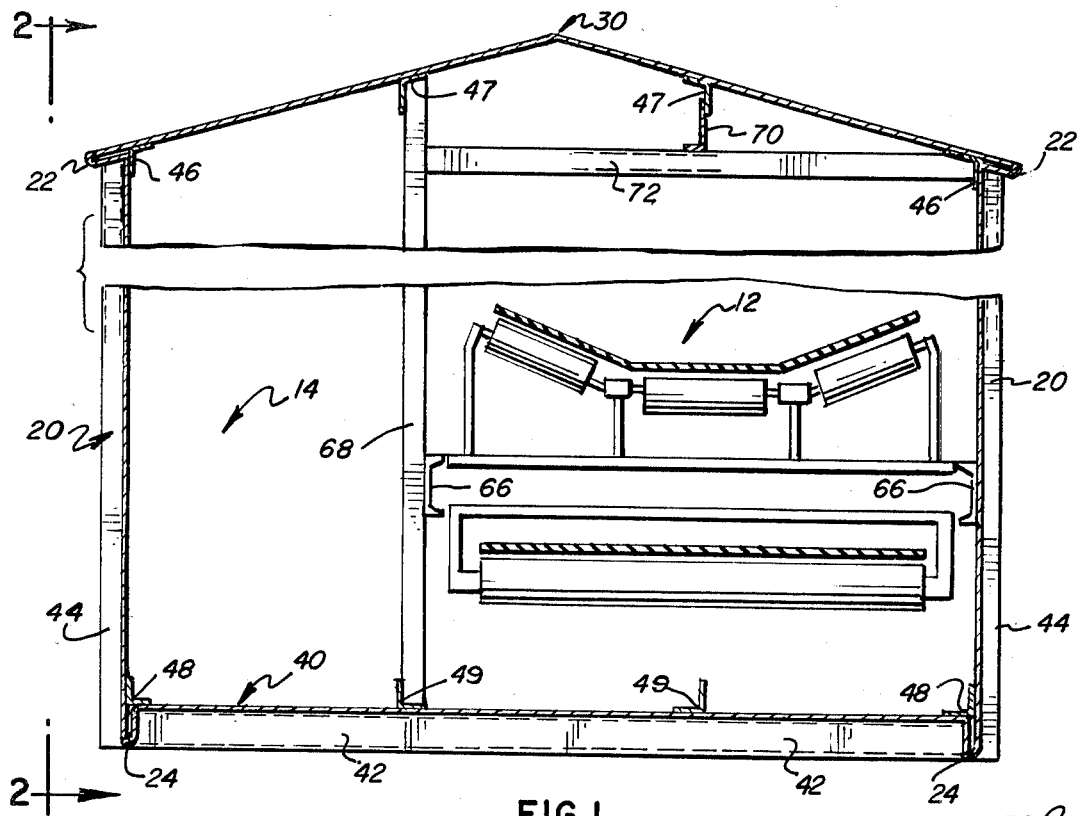
FIG. 1 is a transverse, cross-sectional, view of a new and improved structural enclosure for conveying systems and the like constructed in accordance with the features of the present invention.

Referring now more particularly to the drawings there is illustrated a new and improved weathertight structural enclosure for conveying systems and the like constructed in accordance with the features of the present invention and referred to generally by the reference numeral 10. The structural enclosure or shell is adapted to support and provide a weathertight environment for a conveying system such as a belt conveyor 12 and in addition, provides an adjacent walkway or enclosed path 14 for people for servicing and maintenance of the conveyor. In accordance with a feature of the present invention, the enclosure includes at least one pair of opposite, spaced apart, sidewall panels 20 having integral, preformed, upper and lower flange structures 22 and 24 along the respective upper and lower edges. The shell also includes a sloping roof formed by one or more panels 30 which are interconnected in an end-to-end relation with one another and which are interconnected along opposite lower edges with the upper flange structures of the sidewall panels as will be described hereinafter. The shell further includes one or more floor panels 40 which are connected end to end and which are connected along opposite outer edges to the lower flange structures of the sidewall panels.

Figure 2:
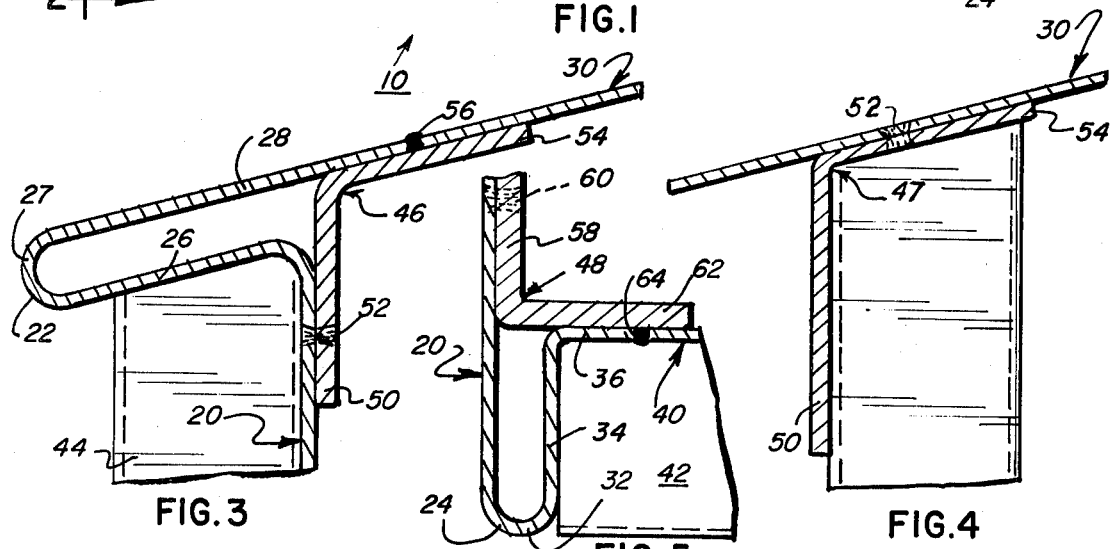
FIG. 2 is a side elevational view of the structure of FIG. 1 looking in the direction of arrows 2—2.

The floor panels are supported underneath by a plurality of transversely extending floor joists 42 which may be hollow tubular members or other suitable structural shapes such as I-beams, angles, channels, and the like extending between the lower flange structures 24 of the opposite sidewall panels. As illustrated in FIG. 2, the transverse floor joists are provided at suitably spaced apart intervals longitudinally of the structural enclosure in order to accommodate the desired design load. These joists provide a backing for the welded joints between the ends of the panels and the floor panels which are of sufficient thickness and strength to accommodate the design load for the particular floor joist spacing involved.

Figures 3, 4, 5:
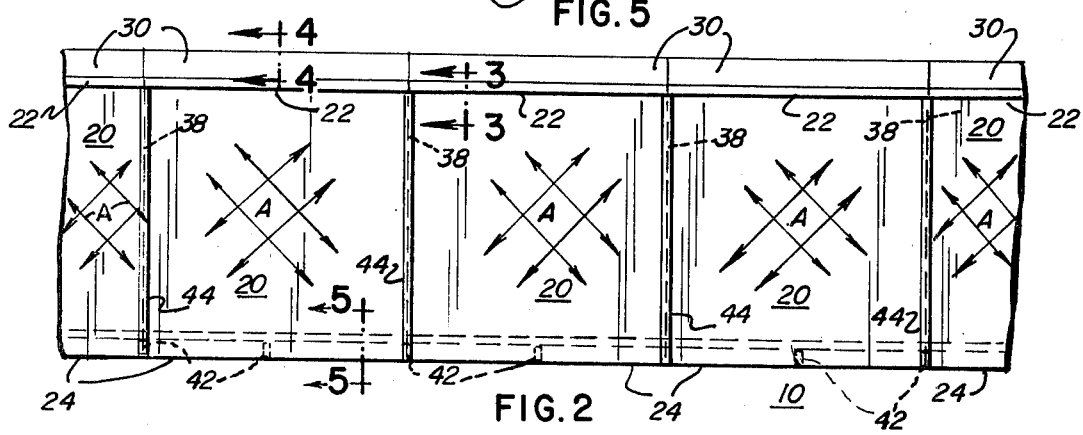
FIG. 3 is a fragmentary transverse sectional view taken substantially along line 3—3 of FIG. 2.
FIG. 4 is a fragmentary transverse sectional view taken substantially along line 4—4 of FIG. 2.
FIG. 5 is a transverse fragmentary sectional view taken substantially along line 5—5 of FIG. 2.

The preformed upper flange structure 22 of the sidewall panels 20 includes a downwardly and outwardly sloping eave 26, a reverse turn 27, and an upwardly and inwardly sloping roof section 28 having an inner edge portion projecting inwardly beyond the main body portion of the sidewall panel as best shown in FIG. 3. The lower flange structure 24 includes a reverse turn 32, an inside upwardly extending vertical flange 34 and an inwardly extending horizontal floor flange 36.

The height of the sidewall panels is dictated or controlled by the spacing required for suitable head room in the walkway or passageway 14. This ample height coupled with the relatively light, design loading which is usual for these types of structures permits the economical use of metal. The thickness of the metal is sufficient to take the diagonal tension stresses and the side panels can be thought of as providing corresponding diagonal elements of an imaginary truss as indicated by the diagonal arrows "A" in FIG. 2. The upper and lower flange structures 22 and 24 of the panels provide portions of the longitudinal upper chords of such an imaginary truss and the side panels act as the truss diagonals which are subjected to tension rather than compression stress tending to cause them to buckle. The vertical or upstanding elements of the imaginary truss are provided by a combination of the vertical edges of the panel ends and vertical stiffeners 44. The panels are welded end-to-end along joint lines indicated by the reference numeral 38 in FIG. 2 and the external stiffeners are secured to the outside surfaces of the adjoining side panels and back up the weld along the joint line. As illustrated in FIGS. 1 and 3, the stiffeners 44 are cut off at their upper ends to closely fit the shape of the underside of the eave 26 of the upper flange structure 22 and the outer, reverse turn 27 of the flange structure extends beyond these stiffeners to provide a drip edge for the enclosure.

In accordance with the invention, additional strength for the longitudinal chords of the imaginary truss is provided by an upper chord 46 and a lower chord 48 along each side panel as best shown in FIGS. 3 and 5. These interior chords are secured to the inside surfaces of the side panels, the roof panels and the floor panels 40, by direct welding along parallel weld lines. The upper chords 46 include a vertical, downwardly extending flange 50 secured to the inside surface of the side panels by a plurality of spot welds 52 spaced at appropriate intervals longitudinally of the structure. The chords also include an upwardly and inwardly sloping roof flange 54 having an inner edge extending inwardly beyond the inner edge of the roof section 28 on the side panel upper flange structure to provide a shelf for the outside edge of a sloping roof panel segment. The chords, side panels and roof panels are all secured together along a continuous weld line 56 parallel to the line of spot welds between the chord and the side panels.

The lower chords 48 include an upstanding vertical flange 58 attached to the inside surface of the side panels by a plurality of spot welds 60 at spaced apart longitudinal intervals along a line. The lower chords include horizontal floor flanges 62 which have inner edges projecting inwardly beyond the inner edges of the flanges 36 of the side panel lower flange structures. The chord flange 62, the flange element 36 and outer edge of the floor panels 40 are all interconnected along a common weld line 64 to complete the formation of a weathertight shell of the enclosure 10. It will thus be seen that each longitudinal section of the structural enclosure includes a pair of opposite side panels 20, a roof panel 30, and a floor panel 40 and each set of panels is joined to an adjacent set in end-to-end relation. Pairs of upper and lower chords extend longitudinally between the sets and are secured along common weld lines including a pair of upper or roof weld lines 56 and a pair of lower floor weld lines 64.

The sheet metal side panels 20 act as elements of a truss wherein the integral, preformed upper flanges 22 in combination with the upper chords 46 act as the upper chord of an imaginary truss. The integral, preformed lower flange structure 24 of the side panels and lower chords 48 act as the lower chord of the imaginary truss and the vertical members of the truss are provided by the vertical stiffeners 44 along the end-to-end welded joint 38 between adjacent sections of the elongated hollow enclosure 10. The skin of the side panels 20 is designed to accept tension stress and serve as the diagonal tension members of the imaginary truss as indicated by the arrows "A" in FIG. 2.

It will also be noted that the roof, sides and floor panels are relatively smooth with no protruding gusset plates, flanges, clip angles, bolt heads, nuts, etc., and the like, on both internal and external surfaces and, accordingly, corrosion and rust problems are minimized in comparison to conventional truss-type conveyor enclosures.

In accordance with the present invention, the conveyor 12 or other elongated conveyor system carried in the interior of the shell is supported by means of a pair of longitudinal side members 66. The righthand member is secured to the inside surface of the righthand side panels 20 of the shell at the desired elevation above the floor. The lefthand conveyor support member 66 is mounted on a plurality of longitudinally spaced apart vertical posts 68 preferably of hollow tubular cross-section and spaced at appropriate intervals along the length of the enclosure as required for the design load to be handled by the conveyor. The posts extend between a lower, longitudinal element 49 and an upper element 47 similar or identical in shape to the respective lower and upper chords adjacent the outer side panels 20. Another pair of upper and lower elements 47 and 49 may also be provided to carry roof and floor loads respectively. The upper elements 47 between the outer side panels 20 and the ridge serve as roof purlins and provide support for the downwardly sloping, opposite roof sections of the roof panels 30. As illustrated in FIG. 1, the righthand intermediate purlin 47 is supported on upstanding brackets 70 which are carried on transverse ceiling joists 72 extending between the posts 68 and the righthand upper chord 46 as illustrated. The structural enclosure or shell 10 may be prefabricated in appropriate, modular sections and the prefabricated sections are then joined together in end-to-end relation to provide the desired overall length for a particular application. The resulting structural enclosure utilizes a system of dual purpose functional elements described hereinafter. The roofing panels 30 and the floor panels 40 in addition to the weather shielding functions also provide a diaphragm for resisting lateral wind loads. The side panels 20 provide weather shielding and diagonal tension members of the imaginary truss of the design. The upper flange structures 22 of the side panels provide both an eave drip and serve as longitudinal upper chord members in combination with the upper chords 46. The lower flange structures 24 of the side panels similarly provide a bottom drip edge and a lower chord member in conjunction with the lower chords 48. The vertical stiffeners 44 provide vertical compression members of the imaginary truss and also provide backup for the common weld joint 38 between the vertical ends of adjacent side wall panels 20. The vertical flanges of the upper chords 46 provide a closure for the eave portion of the upper flange structure of the side wall panels and in addition reinforce or provide a portion of the upper chord of the imaginary truss. The upwardly and inwardly sloping flanges of these upper chords 46 additionally reinforce the upper chord of the imaginary truss and provide a backup for welding along the common welds 56 between the roof panels and the side panels. The vertical flanges of the outside lower chord 48 and element 49 provide kickplates for the passenger walkway 14 and in addition seal off the upper open end of the lower flange structure 24 above the floor level. The floor cross beams or joists 42 provide a backup for the welds between the ends of adjacent floor panels 40 and, in addition, support the floor panels and portion of the roof structure and the conveyor. The conveyor support posts 68 also provide support for the roof panels 30 intermediate the ridge and eave portions and the ceiling joists 72 in addition to providing support for the roof panels 30 intermediate the ridge and eave portions by means of the brackets 70 and the upper intermediate chords or purlins 46 also provide a convenient pipe and/or conduit rack in the shell or enclosure.

From the foregoing, it will be seen that the structural, weathertight enclosure 10 in accordance with the present invention provides a neat and easy way to maintain structure with a minimum of continuing maintenance problems. In addition, the elements making up the structure all serve dual functions as described in some detail. This novel design results in a minimum amount of initial material cost as well as a minimum amount of labor being required for the initial erection and installation. In addition, the novel design reduces maintenance servicing costs normally encountered with prior art type housing structures for conveyors.

The novel shape of the preformed side panels 20 permits the use of these panels for a wide variety of conveyor and walkway combinations. Multiple conveyors of various different sizes and multiple walkways may be accommodated in the structure using a single type of side panel 20 as illustrated and described. The structure may find a variety of uses such as footbridges and the like.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A weathertight enclosure for conveying systems and the like, comprising:
   a sidewall formed of one or more panels of sheet metal joined end-to-end,
   each of said panels including a pair of preformed flange structures along upper and lower edges, said upper flange structure including an outwardly extending eave, a reverse turn and an inwardly extending roof segment, said lower flange structure including a reverse turn, an upwardly extending segment and an inwardly extending floor section;

a roof panel adapted to be joined along an outer edge with said roof segment of said upper flange structure of said sidewall and a floor panel having an outer edge adapted to be joined to said floor section of said lower structure of said sidewall panel.

2. The enclosure of claim 1 including at least one elongated, longitudinally extending upper chord, having a side flange attached to an inside surface of a sidewall panel below said roof section of said upper flange structure and an inwardly extending roof flange attached to the underside of said roof section of said roof panel.

3. The enclosure of claim 2 wherein said roof flange of said chord includes an inwardly extended edge portion projecting inwardly beyond said roof section of said upper flange structure of said sidewall panel and attached to the underside of an outer edge portion of said roof panel.

4. The enclosure of claim 3 wherein said roof section of said upper flange structure of said sidewall, said flange of said upper chord and said outer edge of said roof panel are joined together along a common weld line extending longitudinally of said enclosure.

5. The enclosure of claim 2 wherein said side flange of said chord is secured to said sidewall panel by a plurality of spot welds spaced longitudinally of said enclosure.

6. The enclosure of claim 1 including at least one elongated, longitudinally extending, lower chord having an upstanding side flange attached to an inside surface of said sidewall panel along a lower portion thereof and an inwardly extending floor flange attached to said floor section of said floor panel.

7. The enclosure of claim 6 wherein said floor flange of said lower chord extends inwardly beyond an outer edge of said floor panel.

8. The enclosure of claim 7 wherein said floor flange of said lower chord, said floor section of said lower flange structure of said sidewall and said floor panel are joined together along a common weld line extending longitudinally of said enclosure.

9. The enclosure of claim 6 wherein said side flange of said lower chord is secured to said sidewall by a plurality of spot welds spaced longitudinally of said enclosure.

10. The enclosure of claim 6 including a plurality of floor joists secured below said floor panel extending transversely between said upwardly extending segments of said lower flange structures of said sidewalls.

11. The enclosure of claim 2 including a purlin parallel and spaced inwardly of said upper chord, said purlin including a vertical flange and an inwardly extending roof flange secured to the underside of a roof panel.

12. The enclosure of claim 6 including a longitudinally extending floor beam parallel and spaced inwardly of said lower chord, said floor beam having an upstanding flange and a floor flange secured to said floor panel.

13. The enclosure of claim 1 including a pair of said upper chords, each having its side flange attached to the inside surface of an adjacent sidewall panel and its roof flange secured to an adjacent portion of said roof panel, a pair of lower chords parallel and spaced downwardly of said upper chords, each lower chord having an upstanding side flange attached to the inside surface of an adjacent sidewall panel and an inwardly extending floor flange attached to said floor panel, a purlin parallel and spaced inwardly of said upper chords having an inwardly extending roof flange secured to one of said roof panels, a floor beam parallel of and spaced below said purlin between said lower chords and a floor flange secured to said floor panel, and at least one post interconnected between said purlin and floor beam parallel of said sidewall panels.

14. The enclosure of claim 13 including at least one joist extending transversely between said post and one of said upper chords.

15. The enclosure of claim 1 includes a pair of spaced apart opposite sidewalls, each sidewall includes at least one pair of said sidewall panels interconnected in end-to-end relation along a joint line, and an upwardly extending stiffener element secured to said interconnected sidewall panels on opposite sides of said joint line, said upstanding stiffener element having an upper end abutting said eave of said upper flange structure of said interconnected sidewall panels.

16. The enclosure of claim 15 wherein said upstanding stiffener element has an upper end conforming to the shape of said eave.

17. The enclosure of claim 1 wherein said eave slopes downwardly and outwardly and said roof segment slopes upwardly and inwardly of said reverse turn.

18. The enclosure of claim 17 wherein said roof panel includes a ridge portion raised above the level of said upper flange structure, inwardly of said sidewall, said roof panel sloping downwardly from said ridge portion toward said outer edge.

19. The enclosure of claim 11 wherein said eave slopes downwardly and outwardly and said roof segment slopes upwardly and inwardly of said reverse turn, said roof panel includes a ridge raised above the level of said upper flange structure inwardly of said sidewall, said purlin spaced between said ridge and said sidewall and including an inwardly and upwardly sloping roof flange secured to said roof panel.

* * * * *